United States Patent Office 3,499,952
Patented Mar. 10, 1970

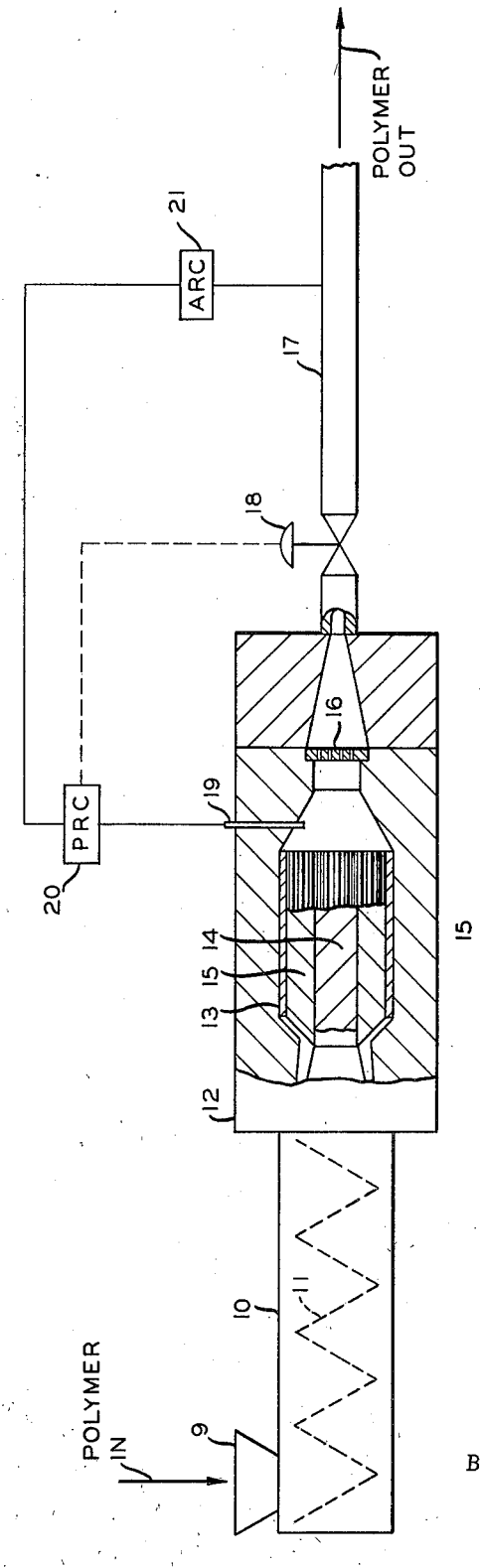

3,499,952
PRESSURE REGULATION IN VISBREAKING EXTRUDER
Samuel J. Kolner and Edward J. Kosinsky, Bartlesville, Okla., assignors to Phillips Petroleum Company, a corporation of Delaware
Filed Jan. 19, 1967, Ser. No. 610,422
Int. Cl. B29f *3/06;* B29b *1/04*
U.S. Cl. 264—40                       4 Claims

ABSTRACT OF THE DISCLOSURE

The melt index of a visbroken poylmer is controlled by correlating melt index with pressure and setting the set point of a pressure controller communicating with a pressure sensing element mounted on the extruder head and a valve located in the conduit removing the visbroken polymer from the shearing and extrusion zones. In an alternate embodiment, the set point of the controller is reset automatically by installing a melt index analyzer in the visbroken polymer removal conduit downstream from the aforementioned valve.

---

This invention relates to a method and apparatus for controlling the pressure in a visbreaking extruder.

It has long been desired to obtain film and other themoplastic articles that are substantially free from visual inhomogeneities, such as gel particles, fisheyes, and other high molecular weight polymeric residue. These resin particles or portions of polymer which have a higher molecular weight than the surrounding polymer mass are believed to be the result of two or more polymer molecules crosslinking. After processing, these impurities are readily apparent through visual inspection. These inhomogeneities can markedly reduce the product in value and render it unsalable.

It is known that high molecular weight thermoplastic polymers can be converted into lower molecular weight polymers by the process of pyrolysis wherein the polymer is partly broken down by thermally induced energy. This pyrolysis or visbreaking of polymers can be accomplished by heating the polymer, such as polyethylene, in a closed stirring vessel containing an inert gas under controlled conditions. Still another method of accomplishing the pyrolysis of polymers is to pass molten polymers through a tube heated to a controlled temperature in the absence of air. This visbroken polymer product, compared to similar solution process products, is relatively viscous at low pressures. These properties are particularly valuable in extrusion due to the good joining properties and improved surface gloss. This visbroken polymer, having a high melt index, is suitable for use in injection molding applications where it offers a combination of good durability and good processing characteristics. Additionally, this visbroken polymer has been used extensively in the extrusive production of pipe, as well as paper coatings.

Regardless of the method used, the amount of visbreaking is very critical to the quality of the finished product. Too little visbreaking results in failure to remove all inhomogeneities; while too much visbreaking results in reduction of the entire polymer mass to molecules of deficient molecular weight. These molecules of low molecular weight are highly undesirable in that they fail to possess good characteristics for industrial processing applications.

An important factor that determines the amount of visbreaking, and hence, the value as a manufacturing material, is the pressure in the milling section. High pressure in the milling section results in lower throughput due to slipback around the feedscrew. The lower throughput results in an increased residence time hence, more visbreaking.

It has been found, surprisingly, that the optimum pressure to conduct visbreaking of homopolymers of ethylene and copolymers of ethylene and 1-olefins containing less than 9 carbon atoms prepared according to the method of Hogan et al., U.S. Paatent 2,825,721, or other suitable methods, is in the range of 4000 to 5000 p.s.i.a. As previously mentioned, pressures below 4000 p.s.i.a. are very unsatisfactory for producing a polymer with good manufacturing characteristics in that there is insufficient visbreaking and the film from said visbroken material has excessive inhomogeneities. Pressures above 5000 p.s.i.a. are also unsatisfactory due to excessive visbreaking. Surprisingly, it is only within the critical range of 4000 to 5000 p.s.i.a. that visbroken polymer with satisfactory manufacturing characteristics can be produced. In view of this, it has been discovered that maintaining the pressure in the extrusion zone within narrow and predetermined limits provides for a significantly improved visbreaking process.

In one embodiment, this invention compries placing a pressure sensing means within the extrusion zone; placing a motor valve downstream in the extrusion zone; and connecting between them a pressure recorder/controller so that said pressure recorder/controller actuates the downstream valve in such a manner that a constant pressure is maintained within the extrusion zone. In another embodiment, a melt index analyzer/recorder/controller is placed downstream from the valve and is used to reset the pressure controller set point. Thus, the set point can be set either manually or automatically, and the melt index of the product can be controlled by controlling the extrusion zone pressure.

Accordingly, an object of this invention is to provide a method whereby the pressure in an extrusion zone of a visbreaking extruder can be automatically maintained at a predetermined level.

Another object of this invention is to provide a method whereby the polymer throughput time can be controlled.

Another object of this invention is to provide an apparatus whereby the pressure in an extrusion zone of a visbreaking extruder can be automatically maintained at a predetermined level.

Other objects, advantages, and features of this invention will be readily apparent to those skilled in the art from the following description, drawing, and appended claims.

With reference to the attached figure, there is indicated an elevation view in cross-section of a conventional visbreaking extruder and a schematic representation of the inventive method being practiced thereon.

With more particular reference to the attached figure, there is indicated feed entry 9 wherein unprocessed polymer is introduced into the extruder. There is also indicated a cylindrical housing 10 containing a coaxially positioned and functioning feedscrew 11. Mechanically linked to feedscrew 11 there is processing section 12, embodying an Egan milling head, as disclosed in U.S. Patent 2,785,438. Processing section 12 comprises an internal gear housing 13, mounted within the shearing chamber by any suitable means to prevent rotation thereof; a drive pinion 14, which is connected by any suitable means to feedscrew 11 to be driven thereby and; a plurality of floating pinions 15, meshing with and disposed between pinion drive 14 and internal gear housing 13, and which rotate free from each other. There is further indicated in the attached figure strainer plate and screen packing 16 held in place across the discharging polymer from the processing section 12. In addition, there is indicated conduit 17 conducting extruded polymer from the extrusion zone, past valve 18, and on to subsequent processing. In summary, the polymer is first passed to a processing zone where the polymer is subjected to a high shearing action, then to an extrusion zone where the material is extruded and passed through a valve at the end of the zone.

Additionally, there is also indicated conventional pressure recorder/controller 20 containing a reset feature, attached to and in communication with pressure sensing means 19, and also attached to, in communication with, and actuating valve 18. Thus, means 19 senses a pressure in the shearing zone and recorder/controller 20 compares the sensed pressure signal with a set point and adjusts valve 18 so as to vary the cross-sectional area of the fluid passage from the extrusion zone. According to this invention, the set point on recorder/controller 20 can be set manually.

In another embodiment, a melt indexer can be used to reset the set point of controller 20. In this embodiment, melt index analyzer/recorder/controller 21, attached to conduit 17, samples the polymer, determines its melt index as disclosed in U. S. Patent 3,252,320, and manipulates the set point of controller 20. After the new set point has been defined, the invention will control the melt index just as if the set point were set manually.

Thus, there are two separate features to this invention. In the first embodiment, the set point is set manually by determining from test data for the particular polymer being visbroken, the pressure set point that will produce the desired melt index. In another embodiment, the polymer is tested, the melt index is determined, and the pressure set point is reset in controller 20. Thus, the second embodiment provides for automatic operation, as the pressure set point is reset by the melt index itself.

Melt index ranges that can be controlled in this invention can vary within the range of about 5 to about 40; however, in one embodiment, a melt index of 25 was used.

In the operation of the invention, polyemer is introduced through feed entry 9 and conveyed through feed-screw 11 to the processing zone 12 containing a shearing and an extrusion zone. The polymer is then sheared in the shearing zone to remove inhomogeneities, filtered, extruded in the extrusion zone, and conducted to further processing. It is within the shearing zone that the polymer is visbroken to eliminate inhomogeneities. As has been mentioned, the amount of visbreaking, or reduction to lower molecular weight polymer units, has a direct relationship to the pressure in the extrusion section. Pressures below the range of 4000 to 5000 p.s.i.a. produce extremely inhomogeneous and undesirable products. Pressures above the aforementioned range result in excessive visbreaking. It has, therefore, been demonstrated that operation within the narrow range aforementioned produces a product of superior value to that produced at lower or higher pressures.

Any type of polymer that will flow smoothly through the extruder and contains high molecular weight inhomogeneities that can be eliminated by visbreaking can be used in this invention. Specifically, polyethylene responds to these characteristics and is a suitable material.

As a consequence of polymer slipback around the feed-screw, increased extrusion zone pressure reduces rather than maintains the throughput rate. In spite of this, there is a substantially definite correlation between residual time and extrusion zone pressure. In view of this correlation, this inventive method can be used to regulate the throughput residual time.

This invention is thus broadly applicable to producing a visbroken polymer of predetermined melt index by controlling the pressure in the extrusion section.

Various modification of this invention can be made in view of the foregoing disclosure and the appended claims without departing from the spirit or scope thereof.

In a specific embodiment of the inventive process, with 5 pinions in the milling head, polyethylene with a high load melting index in the 3 to 4 range was visbroken to the 18 to 23 melt index range at approximately 900 pounds per hour processing rate, employing an extrusion zone pressure of 4300 p.s.i.a. Three samples, taken at the end of the test, were assigned gel ratings. The gel ratings for these and all other runs disclosed are identical with those used in Table I. The same samples gave paper coating weights of 1.35 to 2.03 pounds per ream at 1200 f.p.m. line speed in later tests. Based on these data, the resins would be acceptable for compounding into film grade resin. The high load melt index was measured in accordance with ASTM method D–1238–57T, Condition F, wherein the melt index was determined at 190° C. and 21,600 grams.

In five further specific embodiments of the inventive method, the following information was recorded and is presented in Table I.

FIRST RUN

The unit was operated with 7 pinions in the milling head. Current production resin, comprising a copolymer of ethylene and butene-1 with a density of .940 gm/cc., prepared according to the method of Hogan et al., U. S. Patent 2,825,721, and having a high load melt index of 3.57, was visbroken to produce resins with melt indexes ranging from 17.4 to 36.8. All samples contained much gel when extruded into film.

SECOND RUN

Equipment and feed were the same as on the first test. Gel content of the visbroken resin was very low.

THIRD RUN

Another specific resin, comprising a homopolymer of polyethylene, prepared according to the method of Hogan et al., U. S. Patent 2,825,721, and having a high load melt index of 3.57, was visbroken using 7 pinions in the milling head. The feed, an off-specification lot, contained much fine material. The product contained much gel.

FOURTH RUN

The equipment and feed were the same as on the third test, but a different lot of resin was used. The melt index was high and the resin contained much gel. Gel content was reduced significantly when valve 18 was closed to pressure of 4000 p.s.i.a. in the extruder.

FIFTH RUN

The resin tested was the same as that used in the third test. Gel content of the visbroken resin was high until the pressure in the milling head reached 4400 p.s.i.a.

TABLE I

First run

| Extrusion zone pressure | Visual rating of film [1] |
|---|---|
| 2200 | 4 |
| 2300 | 4 |
| 2525 | 4 |
| 3000 | 4 |
| 3300 | 4 |

Second run

| 4900 | 1 |
|---|---|
| 4600 | 1 |
| 5000 | 2 |
| 4800 | 2 |
| 4600 | 2 |
| 4500 | 2 |

Third run

| 2700 | 4 |
|---|---|
| 3400 | 3 |
| 2300 | 4 |
| 2000 | 3 |

Fourth run

| Pressure | Rating |
|---|---|
| 2000 | 4 |
| 1700 | 4 |
| 2800 | 3 |
| 2800 | 3 |
| 2900 | 3 |
| 3000 | 3 |
| 3000 | 3 |
| 3400 | 3 |
| 4000 | 2 |

Fifth run

| Pressure | Rating |
|---|---|
| 3500 | 4 |
| 3300 | 3 |
| 3200 | 3 |
| 3600 | 2 |
| 3600 | 2 |
| 4400 | 1 |

¹ Visual rating of finished film:
  (1) Very slight inhomogeneities
  (2) Slight inhomogeneities
  (3) Moderate inhomogeneities
  (4) Considerable inhomogeneities It is clearly evident from the data presented in Table I that, in order to produce a film of good quality containing either very slight inhomogeneities or only slight inhomogeneities, the pressure range must be within the range of 4000 to 5000 p.s.i.a.

That which is claimed is:

1. A method of visbreaking homopolymers of ethylene or copolymers of ethylene and 1-olefins containing less than 9 carbon atoms comprising the steps of:
   (a) subjecting the polymer to a high shearing action in a shearing zone;
   (b) extruding the sheared polymer through a passage of restricted cross-section in an extruding zone;
   (c) sensing the pressure in the extrusion zone and establishing a signal reflective thereof; and
   (d) controlling the pressure in the extrusion zone, in response to said established pressure signal, to maintain said pressure in the range of 4000 to 5000 p.s.i.a., the gel content of the visbroken polymer thereby being satisfactorily controlled due to the maintenance of the pressure in the extrusion zone being within the above range.

2. The method of claim 1 further comprising the steps of:
   (a) comparing said established pressure signal with a signal representing a predetermined pressure value to produce a signal reflective of said comparison; and
   (b) adjusting the cross-sectional area of said passage from the extrusion zone in response to said signal reflective of said comparison so as to control the pressure within the extrusion zone and produce a gel-free visbroken polymer product.

3. The method of claim 2 further comprising the steps of:
   (a) establishing a signal reflective of the melt index of the polymer; and
   (b) adjusting said predetermined pressure value responsive to said signal reflective of melt index so as to regulate the melt index of the polymer.

4. The method of claim 3 wherein said 1-olefin comprises butene-1.

References Cited

UNITED STATES PATENTS

| | | | |
|---|---|---|---|
| 3,148,231 | 9/1964 | Spencer | 264—40 |
| 3,230,288 | 1/1966 | Henderson | 264—176 |
| 3,248,469 | 4/1966 | Kosinsky et al. | 264—349 |

ROBERT F. WHITE, Primary Examiner

J. R. THURLOW, Assistant Examiner

U.S. Cl. X.R.

18—12; 264—176, 349